United States Patent Office 3,148,282
Patented Sept. 8, 1964

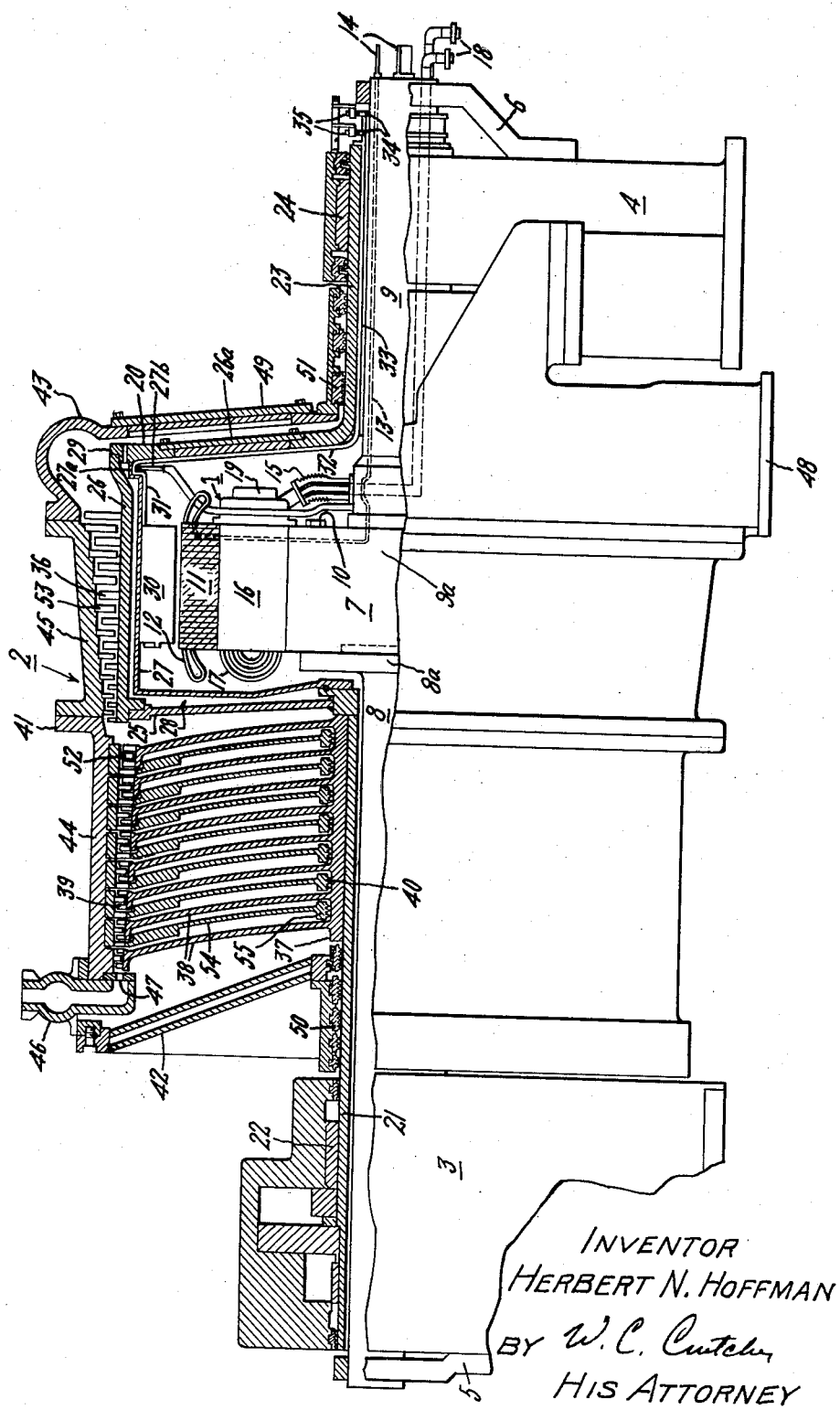

3,148,282
INTEGRAL TURBINE-GENERATOR SET
Herbert N. Hoffman, Lunenburg, Mass., assignor to General Electric Company, a corporation of New York
Filed Nov. 27, 1961, Ser. No. 155,018
3 Claims. (Cl. 290—52)

This invention relates to an improved arrangement for an electric generator driven by an elastic fluid turbine, such as a steam turbine, in which the rotor turns at low speeds for reducing noise and vibration.

The conventional arrangement for a turbine-generator set is to employ two separate units, a turbine and a generator with the rotors coupled together. This convention of coupling the driving and the driven units in tandem causes the turbine-generator set to be of susbtantial length.

For some applications, the usual 1800 or 3600 r.p.m. rotor speeds employed in direct-coupled turbine-generators give rise to annoying vibration or noise. This is due in some part to the requirement for perfect alignment between the coupled units. Also, as in shipboard installations, where silence is at a premium, the higher speed sets can give rise to annoying high frequency sound transmitted through the hull.

Accordingly, one object of the present invention is to provide an improved integral turbine-generator set of greatly reduced length.

Another object of the invention is to provide a turbine-generator set which runs at low speed, hence reducing the frequency of the structure-borne vibration caused by vibration of the rotor.

Another object of the invention is to provide a turbine-generator set having a single rotor member which acts both as generator rotor and turbine rotor.

Another object of the invention is to provide an improved cooling arrangement for an integrated turbine-generator set.

Another object of the invention is to provide a turbine-generator set which eliminates coupled rotors and requires only two bearing suports.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawing in which the single figure of the drawing shows an elevation drawing, partly in section, of a turbine-generator set according to the invention.

Briefly stated, the invention is practiced by placing a stationary generator armature inside an enlarged hollow turbine rotor drum and disposing the generator poles on the interior of the turbine drum so as to rotate therewith. The generator armature is supported by a beam passing through the rotor shaft, which beam also carries the generator primary leads and the generator cooling pipes.

GENERAL DESCRIPTION

Referring now to the drawing, the turbine-generator set is seen to comprise a generator, shown generally as 1, disposed inside an enlarged steam turbine, shown generally as 2. The supporting structure for the turbine-generator set comprises a pedestal 3 on the turbine inlet end, and a pedestal 4 on the generator end. Supporting brackets 5, 6 attached to pedestals 3, 4 respectively, support the stationary members of generator 1 by a stationary beam 7 extending the entire length of the turbine-generator set. Beam 7, in this embodiment, is a composite member comprising a left-hand cylindrical member 8, having an end flange 8a, and a right-hand cylindrical member 9, having a central flange 9a. Flanges 8a, 9a are bolted together by a ring of bolts 10, so that members 8, 9 act as a single beam indicated by numeral 7.

The Generator Armature

Disposed radially outward of beam 7 on central flange 9a is a laminated generator armature core 11 having windings 12 thereon. The current generated in windings 12 is led out through insulated leads, one of which is seen at 13 to the external phase connection 14.

Also supported by beam 7 and disposed on central flange 9a is a generator cooler 16, having coils 17, through which is circulated water or other liquid coolant. The liquid supply for coils 17 is also led in through double walled conduits 15 from external liquid cooling connections 18. The space between walls of conduits 15 is used to collect any leakage which may take place from the inner conduit. A fan 19 provides supplementary cooling of windings 12 during shutdown. A heating unit (not shown) may also be provided to keep the windings 12 dry during shutdown.

The Composite Rotor Member

Disposed coaxially outward of beam 7 and generator armature 11 is a rotor member, shown generally as 20. Rotor 20 comprises a rotating shaft portion 21 on the turbine inlet end journalled by a bearing 22, and a rotating shaft portion 23 on the generator end journalled by a bearing 24. Shaft portions 21, 23 are joined by a double-walled rotor drum 25 having an outer fabricated wall 26 and an inner fabricated wall 27. Walls 26, 27 define an annular chamber 28 therebetween, which is connected to the turbine exhaust annulus by means of a conduit 29. Therefore, drum 25 has an evacuated space between its double walls, in order to prevent leakage of high-pressure steam into the generator portion.

It may be seen that wall 27 forms an annular pocket 27a to collect any liquid leaking from the generator cooling system. A probe 27b attached to the stationary beam 7 detects or collects accumulated liquid.

Disposed on the inside of drum 25 are the rotating generator poles 30, which are provided with excitation current by leads 31. Leads 31 pass radially inward on the inside of the drum wall as indicated at 32, where they are conducted through suitable grooves in a sleeve 33 coaxial with and attached to the inside of shaft sleeve 23. The excitation current is supplied through slip rings 34 from a suitable source (not shown) by means of brushes 35. An access opening 26a is provided for servicing internal parts of the generator.

Disposed on the outer periphery of drum 25 are a number of axially spaced circumferential rows of low-pressure turbine blades, one of which is seen at 36. The evacuated space 28 substantially reduces the flow of heat from turbine blades 36 to the generator poles 30.

The high-pressure section of the turbine is "disk and diaphragm" type, rather than "drum type" in order to reduce the problem of sealing against leakage of the higher pressure steam between turbine stages. The high-pressure portion of the turbine rotor comprises a sleeve 37 attached to rotate with shaft portion 21 and carrying a number of axially-spaced disks 38. In order to reduce the axial deflection of disks 38, they are made in a "dished" shape, which may be a section of a paraboloid or a sphere. Disks 38 each carry two axially-spaced circumferential rows of turbine blades, one of which is seen at 39. High-pressure rotor sleeve 37 also includes sealing surfaces 40 between disks 38.

The Turbine Casing

Disposed coaxially with and radially outward of rotor 29 is a turbine casing shown generally as 41. Casing 41 includes a conical end wall 42 on the high-pressure end, exhaust scroll and end wall 43 on the low-pressure or generator end, a cylindrical high-pressure casing 44 and a cylindrical low-pressure casing 45. Cylindrical high-pressure casing 44 includes an inlet conduit 46 admitting high-pressure steam as controlled by a control valve (not shown) through a nozzle 47. The exhaust annulus of 43 terminates in an exhaust duct 48. An access opening 49 is provided for servicing the generator interior parts. The outer casing 41 also includes the usual steam seals, 50, 51, on either end cooperating to prevent leakage of steam along the shaft portions 21, 23 respectively.

Disposed on the inside of high-pressure cylindrical casing 44 and low pressure casing 45 are stationary axially-spaced circumferential rows of high-pressure turbine stator blades 52 and low pressure stator blades 53. Also supported by casing 44 are axially-spaced dished diaphragm members 54, carrying seals 55 on the innermost portion thereof, which cooperate with sealing surfaces 40 to prevent leakage.

*Operation and Advantages*

The operation of the improved turbine-generator arrangement may be described as follows. Due to the large pitch diameter of the turbine blades 36, 39, 52, 53, adequate tangential relative velocity of the blades past one another can be obtained to pass the required flow of steam without requiring high rotor speeds. For example, the present embodiment of the invention is designed to produce 1800 kw. while turning at only 450 r.p.m. The slower rotational speed of the rotor greatly reduces the vibrational problems which are encountered when shafts are turning at greater speeds. Thus, a lower level of structure-borne vibration is possible with the turbine-generator set depicted than would be possible with a higher speed unit.

The large diameter of the low-pressure drum rotor enables the generator to be placed inside the drum. Considerable tangential velocity of generator poles 30 past armature 11 is possible even at the low rotor r.p.m., due to the large diameter. The windage caused by the poles 30 and the inner side wall 27 of the rotor drum causes a sufficient circulation of air past the air cooler coil 17, although fan blades can be added if needed to augment the cooling. This serves to keep the generator coils 12 at a low temperature despite the fact that the generator is located inside the turbine drum. Leakage of steam is prevented into the generator enclosure by means of space 28 connected to the turbine exhaust by conduit 29, so that any steam leaking past outer wall 26 will immediately flow to the turbine exhaust. The evacuated space 28 also serves to prevent conduction of heat inward from the steam and turbine blades 36.

Due to the fact that the armature core is supported on a central stationary beam member, it is a relatively simple matter to bring cooling liquid from the external connections 18 to the coil 17, whereas other liquid-cooled arrangements for a conventional generator armature require annular headers, since the bore is ordinarily obstructed by the generator rotor.

It should be noted that the rotor member performs the composite function of turbine rotor and generator rotor. Hence, it need be supported by only two bearings and does not require the usual coupling between turbine and generator rotor. It should also be noted that, since one rotor performs the functions of two, the length of the turbine-generator set need not be substantially greater than the length of only one of the two units that were previously coupled together with conventional construction. Thus, the turbine-generator set is integrated into a single unit which is much shorter than were previous constructions. Also the problem of alignment of coupled units and the possibility of vibration from this source is avoided.

Although the stationary central beam 7 is shown as made up of two flanged members 8, 9, it could also be a single member. Although members 8, 9 are shown to be cylindrical, they could be any structural shape suitable for a beam, such as an I-beam with a covering sleeve of cylindrical shape to reduce windage. Such member of cylindrical shape can easily be adapted for carrying a structural the longitudinal insulated leads to the turbine armature, and the liquid cooling pipes to the air cooler.

While there has been described what is at present considered to be the preferred embodiment of the improved turbine-generator set arrangement, it will be understood that various modifications may be made therein, and it is intended to cover in the appended claims all such modifications as fall within the true spirit and scope of the invention.

What I claim as new and desire to secure by Letters Patent of the United States is:

1. An integrated steam turbine-generator unit comprising:
    first and second spaced bearing pedestals,
    a stationary beam member having end portions secured to support means fixed to the exterior end portions of said pedestals,
    a stationary annular generator armature member disposed on an intermediate portion of said beam member,
    cooling means disposed in heat exchange relation with said armature member and connected to coolant fluid conduits carried by said beam member,
    a hollow cylindrical rotor member including tubular end portions disposed coaxially around said beam member and journaled in said bearing pedestals,
    said rotor member having a first enlarged central drum portion disposed around and spaced radially from said armature member,
    a second inner rotor drum member disposed within and spaced from said first drum portion to define an annular insulating chamber,
    generator pole members disposed on the inner periphery of said second rotor drum member in cooperative relation with the generator armature,
    a plurality of axially spaced circumferential rows of turbine rotor blades disposed on the outer periphery of said first drum portion,
    a stationary turbine casing disposed around and spaced radially from said first rotor drum portion and having a plurality of axially spaced circumferential rows of turbine stator blades cooperating with said rotor blades,
    nozzle means at one end of said turbine casing for admitting hot elastic motive fluid to said turbine blades,
    the opposite end of the turbine casing defining a low pressure discharge chamber for the motive fluid,
    said first rotor drum portion having passage means connecting said insulating chamber to said turbine discharge chamber.

2. An integrated steam turbine-generator unit comprising:
    first and second spaced bearing means,
    a stationary cylindrical beam member having end portions secured to the exterior side portions of said bearing means,
    a stationary generator armature member carried on an intermediate portion of said beam member,
    a dual function hollow cylindrical rotor member including tubular end portions projecting coaxially around said beam member from either side of the generator armature member and journaled in said respective bearing means,
    said rotor member having a first enlarged central drum portion disposed around and spaced radially from said armature member,
    a second rotor drum member disposed within and having peripheral and sidewall portions spaced from said first drum portion to define an annular insulating chamber surrounding the generator armature and extending radially inwardly adjacent one end of the generator armature, generator pole members disposed on the inner periphery of said second rotor drum member in cooperative relation with the generator armature, a low pressure turbine section comprising a plurality of axially spaced circumferential rows of rotor blades disposed on the outer periphery of said first drum portion, a high pressure turbine section comprising a plurality of axially spaced blade-carrying disk members projecting radially outward from the tubular rotor end portion at the side of the generator armature adjacent the inwardly extending portion of said insulating chamber, a stationary turbine casing disposed around said high pressure disk members and said first rotor drum portion and having a plurality of axially spaced circumferential rows of stator blades cooperating with said high pressure and low pressure rotor blades, nozzle means at the high pressure end of the turbine casing for admitting hot motive fluid to said turbine blades, the opposite end of the stationary turbine casing defining a low pressure motive fluid discharge chamber, said first rotor drum portion having passage means connecting said insulating chamber to said turbine discharge chamber whereby the insulating chamber impedes the flow of heat from the high pressure and low pressure turbine sections into the generator armature.

3. A dual-function rotor for an integrated steam turbine-generator comprising:

a first rotatably mounted hollow drum member having a plurality of axially spaced circumferential rows of turbine blade members disposed on the outer surface thereof, a second hollow drum member disposed within and secured to said first drum member to define an evacuated annular space therebetween, and generator pole members disposed on the inner peripheral surface of said second drum member, whereby said annular space serves to reduce the flow of heat from the turbine blade members to the generator pole members.

References Cited in the file of this patent
UNITED STATES PATENTS

| | | |
|---|---|---|
| 748,215 | Porter et al. | Dec. 29, 1903 |
| 2,634,375 | Guimbal | Apr. 7, 1953 |
| 2,984,751 | Cliborn | May 16, 1961 |